United States Patent [19]

McKee

[11] 4,349,980

[45] Sep. 21, 1982

[54] RODENT EXTERMINATING APPARATUS

[76] Inventor: James E. McKee, Suite 580, States General Life Bldg., 708 Jackson, Dallas, Tex. 75202

[21] Appl. No.: 179,168

[22] Filed: Aug. 18, 1980

[51] Int. Cl.$^3$ .............................................. A01M 23/14
[52] U.S. Cl. ......................................... 43/81; 43/83.5; 43/75
[58] Field of Search ................... 43/58, 73, 75, 77, 78, 43/79, 80, 81, 82, 83, 83.5

[56] References Cited

U.S. PATENT DOCUMENTS

| | | | |
|---|---|---|---|
| 2,199,167 | 4/1940 | Brooks | 43/82 X |
| 2,531,568 | 11/1950 | Helme | 43/78 X |
| 2,684,553 | 7/1954 | Schroeder | 43/81 |
| 3,468,054 | 9/1969 | Levine | 43/98 |
| 3,638,348 | 2/1972 | Lusk | 43/78 X |
| 3,827,176 | 8/1974 | Stirewalt | 43/98 |
| 3,896,581 | 7/1975 | Gabry | 43/81 |
| 4,074,456 | 2/1978 | Tidwell | 43/98 |
| 4,127,958 | 12/1978 | Peters et al. | 43/81 |

FOREIGN PATENT DOCUMENTS

| | | | |
|---|---|---|---|
| 471253 | 2/1951 | Canada | 43/83.5 |
| 670045 | 9/1963 | Canada | 43/79 |
| 630906 | 10/1949 | United Kingdom | 43/81 |

OTHER PUBLICATIONS

"Laser Beam Mousetrap", J.S. & A. Catalog, p. 30, 1978.

*Primary Examiner*—Nicholas P. Godici
*Attorney, Agent, or Firm*—Hubbard, Thurman, Turner, Tucker & Glaser

[57] ABSTRACT

A rodent exterminating apparatus having a frame on which a pivotally mounted striking bar is operable to be moved from a retracted position to a striking position by a pneumatic actuator including a one way spring return rolling diaphragm operated plunger. The actuator is operated by a pneumatic control circuit which senses the presence of a rodent to cause a fast acting valve to direct pressure air to the actuator from a reservoir chamber which is formed as part of the actuator. The control circuit includes a pneumatic time delay device which automatically moves the control valve to reset the striking bar after a predetermined period of time commencing with deactivation of a trigger or proximity sensor in the control circuit.

22 Claims, 9 Drawing Figures

RODENT EXTERMINATING APPARATUS

BACKGROUND OF THE INVENTION

1. Field of the Invention

The present invention pertains to an automatically resetting rodent exterminating apparatus having a mechanical crushing or striking bar which is powered by a pressure fluid operated actuator.

2. Description of the Prior Art

The long standing problem of rodent control has resulted in a number of inventions directed to devices for trapping and exterminating rodents of various kinds. Mechanical traps and exterminating devices of various types have been developed and known for many years. However, recently greater emphasis has been placed on chemical poisons as a major means of rodent extermination because they have been determined to be cost effective. The development of rodents which are largely immune to certain chemical poisons, the environmental concerns regarding the use of poisons, and other disadvantages of chemicals has resulted in the realization that a rodent control device which is effective as well as non-toxic is preferably a mechanical device. Moreover, in most facilities where rodent control is required such as food storage areas it is desirable to provide exterminating apparatus which is capable of delivering a fatal injury to the rodent at the immediate site of the apparatus to eliminate the problem of disabled rodents leaving the site to expire elsewhere in an area where it is undesirable for the rodent carcass to remain.

It has also been deemed desirable to provide rodent exterminating apparatus which is automatically resettable or otherwise capable of operating continuously for long periods of time to exterminate a number of rodents without attention from operating personnel. In this regard electromechanical as well as electrocution type exterminating devices have been developed. However, electrical devices are not suitable for many locations such as grain storage areas and the like because of the hazard created by electrical arcing in an explosive atmosphere. Moreover, electrical as well as certain other known mechanical devices can be hazardous to operating personnel during set up and servicing.

Other problems associated with prior art exterminating devices of the break back or striking bar type include lack of mechanical power or force exertion sufficient to kill large rodents in the immediate vicinity of the device itself and the slow response time for actuation of the striking mechanism after being triggered by the rodent.

SUMMARY OF THE INVENTION

The present invention provides an improved rodent exterminating apparatus of the so called break back or striking bar type which is power actuated, is automatically resetting for continuous operation, is less hazardous to servicing personnel, is adapted for use in hazardous or potentially explosive environments where the likelihood of explosions or fires resulting from actuation of the apparatus are minimized, and may be self contained.

The present invention also provides a rodent exterminating apparatus which is adapted to be operated by pressure fluid such as compressed air supplied by a central source, by a source, by a source located in the immediate vicinity of the apparatus such as a portable pressure vessel or bottle, or by a reservoir or chamber provided on the apparatus itself as an integral part of a pressure fluid operated actuator. In accordance with the present invention the exterminating apparatus includes a pneumatic actuator for actuating a striking bar to deliver a fatal blow to a rodent followed by automatic resetting of the actuator and the striking bar after a predetermined period of time to assure that the rodent has expired in the immediate vicinity of the apparatus itself.

The present invention also provides for a rodent exterminating apparatus which is particularly adapted to be operated in hazardous environments where explosions or fires are easily ignited and wherein the apparatus includes features which minimize the risk of fires or explosions resulting from operation of the apparatus.

The present invention further provides a rodent exterminating apparatus which may be mounted in a variety of operating positions and which may be adapted to be used as a walk-in device or as a pass through type device depending on the type of installation or facility in which the apparatus is to be located.

The present invention still further provides a rodent exterminating apparatus which includes an improved control system providing for rapid actuation of the exterminating mechanism and a time delayed resetting of the mechanism to maximize the effect of the blow and crushing action of the mechanism.

In accordance with one embodiment of the control system for the exterminating apparatus of the present invention a novel pressure fluid time delay device is provided which together with a main supply valve for releasing pressure fluid into the actuator piston chamber provides more reliable control over the operation of the apparatus. Moreover, the time delay mechanism of the present invention is more economical to manufacture than prior art pneumatic timers and is adaptable to existing control components.

In accordance with another embodiment of the present invention a control system is provided which includes proximity sensing means which senses the movement of a rodent past a predetermined point for causing the operation of the actuator to actuate the striking or crushing mechanism.

The present invention also provides for a rodent exterminating apparatus which has an improved triggering mechanism upon which bait or an attractant may be mounted in such a way that accidental triggering of the striking mechanism is minimized.

The present invention still further provides an improved power operated rodent exterminating apparatus which is advantageously fabricated of a number of formed wire and molded plastic components and is thereby economical to manufacture and is reliable in operation.

The above noted as well as other superior features of the present invention will be further appreciated upon reading the detailed description of the preferred embodiments in conjunction with the drawings.

DESCRIPTION OF THE PREFERRED EMBODIMENTS

Figure 1:
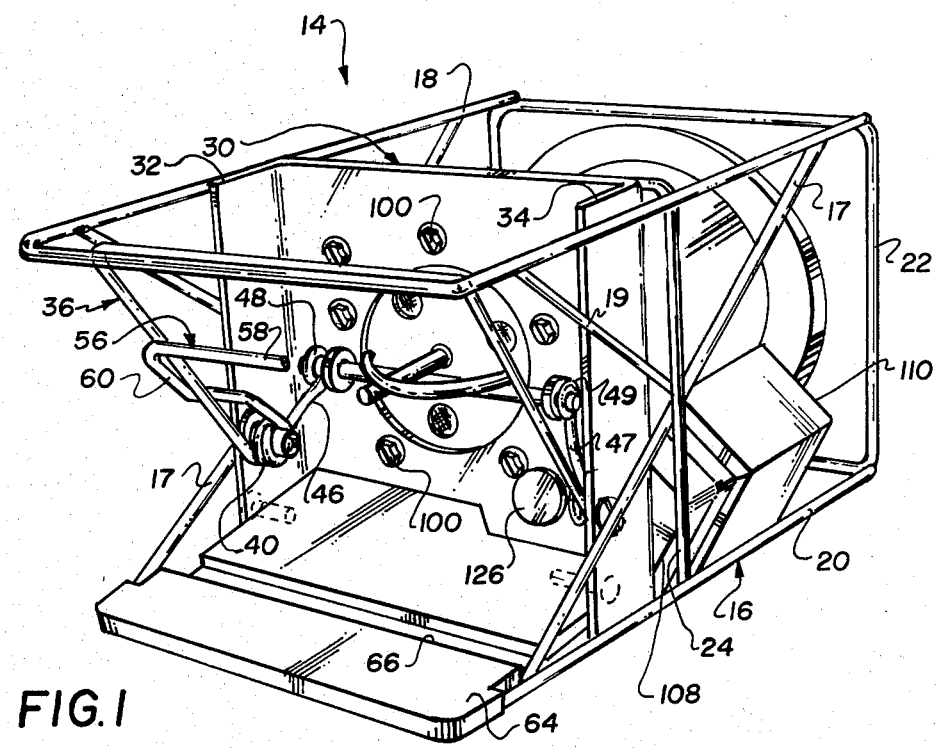
FIG. 1 is a perspective view of the apparatus of the present invention showing the striking bar in a cocked or reset position.
Figure 2:
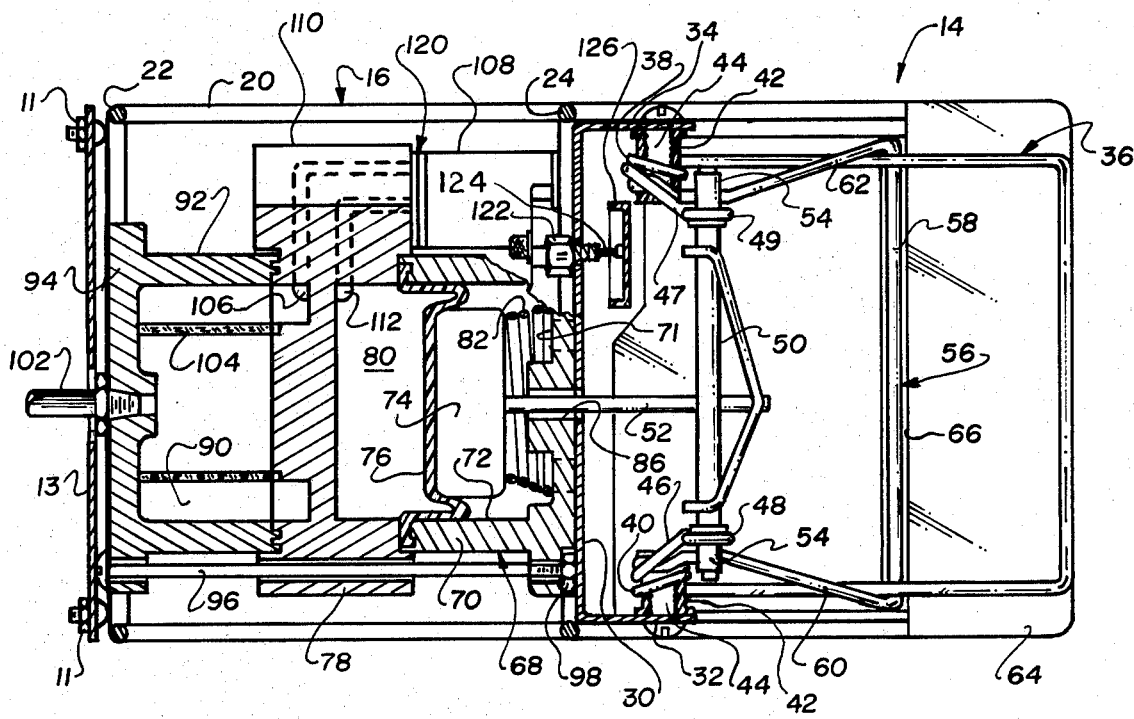
FIG. 2 is a plan view of the apparatus of the present invention and showing the actuator in longitudinal section.
Figure 3:
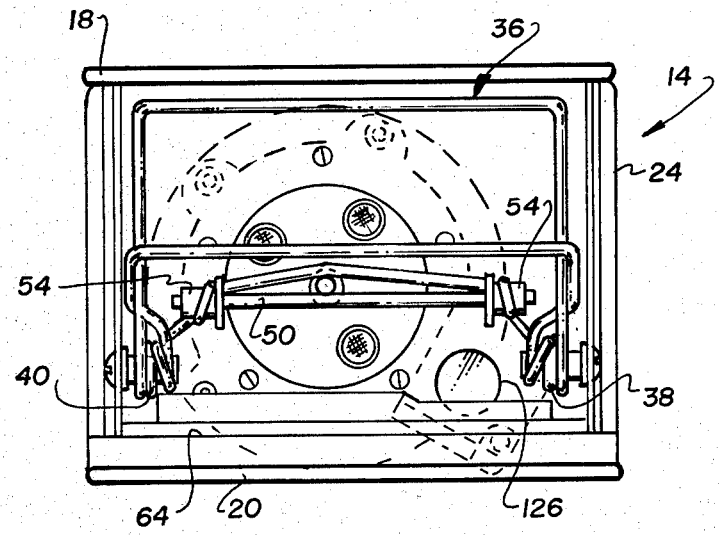
FIG. 3 is a front elevation of the apparatus.
Figure 4:
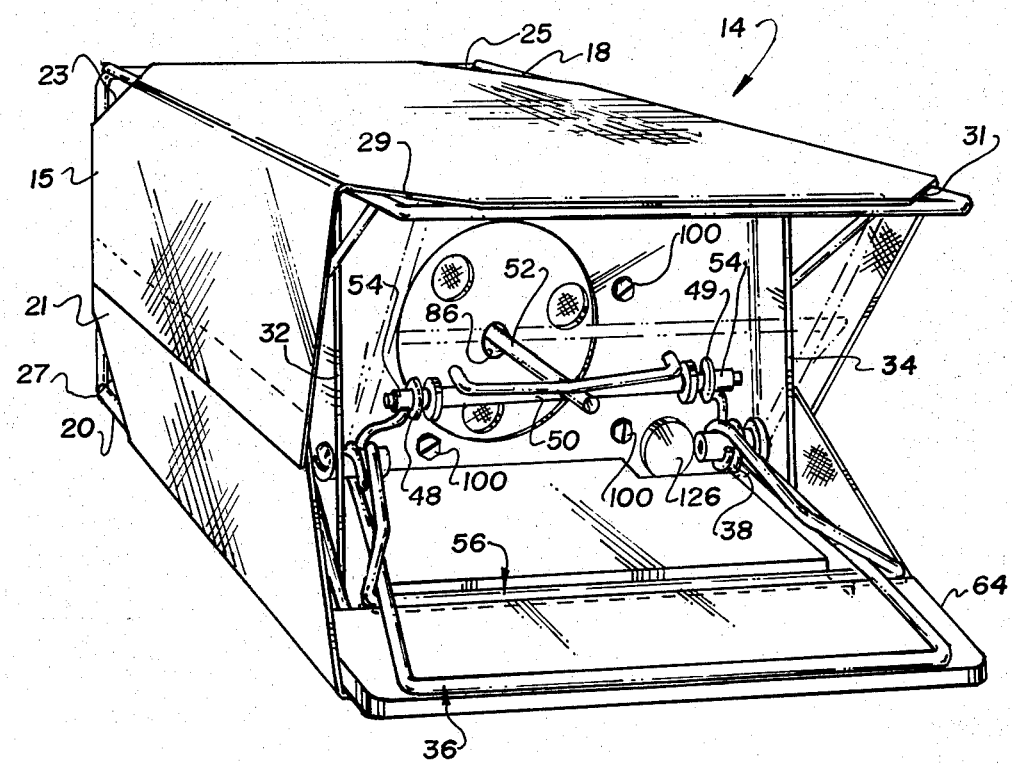
FIG. 4 is a perspective view showing the striking bar in the actuated position.

Referring to FIGS. 1 through 4 of the drawings the improved exterminating apparatus of the present invention is illustrated and generally designated by the numeral 14. The apparatus 14 is characterized by a frame 16 including top and bottom substantially U-shaped formed wire members 18 and 20 which are interconnected by spaced apart transverse perimeter members 22 and 24. As shown in FIGS. 1 and 4 the frame 16 is reinforced by a plurality of struts 17 and 19. All of the aforedescribed members are suitably welded together to form a lightweight rigid unitary frame member. The formed wire members may be suitably made of steel wire of preferably number 5 gauge (American Wire Gauge).

As shown in FIG. 4 the frame 16 is adapted to be enclosed within a perforated or expanded metal enclosure made up of upper and lower overlapping parts 15 and 21 which may extend substantially the entire length of the perimeter frame members 18 and 20. The enclosure is preferably cut away at each corner as shown by way of example by the diagonal edges 23, 25, 27, 29 and 31, to provide for hanging the apparatus from a wall or other structure. In the embodiment of the present invention illustrated in FIGS. 1 through 4 the frame 16 is open across the transverse end adjacent to which the striking mechanism is disposed to provide a so called walk-in or head-in type exterminating apparatus. A transverse closure plate 13 is disposed across the opposite end of the frame 16, as shown in FIG. 2, and is suitably removably secured to the frame by fasteners 11. The frame 16 is further adapted to support a transverse bulkhead 30 which includes opposed longitudinally extending side portions 32 and 34. The bulkhead 30 is preferably made of steel or aluminum plate and is suitably welded to the frame 16.

The exterminating apparatus 14 includes a formed wire pivotally mounted striking or crushing bar 36 which includes spaced apart integral loop portions 38 and 40 forming bearings for rotatably mounting the bar on the apparatus. The bearings 38 and 40 are disposed on opposed axially aligned bushings 42 which are respectively suitably mounted on opposed axially aligned trunnions 44 each mounted on the bulkhead side portions 32 and 34 as illustrated. The striking bar 36 also includes integrally formed crank portions 46 and 47 which terminate in respective integrally formed bearings 48 and 49. The bearings 48 and 49 of the striking bar 36 are respectively operably engaged with opposite ends of a cross bar portion 50 of a piston rod 52. Plastic bushings 54 are mounted on opposite ends of the cross bar 50 and form journals between the cross bar and the bearings 48 and 49.

The bushings 42 also support opposite end portions of an intermediate striking bar 56 which has a transverse portion 58 disposed under the bar 36. The intermediate striking bar 56 includes integral leg portions 60 and 62 which are formed to pass over the corresponding leg portions of the striking bar 36 thereby providing for movement of the bar 56 together with the bar 36.

The main striking bar 36 is operable to be forcibly pivoted about the trunnions 44 toward an anvil 64 which is suitably mounted on the frame 16 and includes a transverse recess 66 for receiving the intermediate striking bar 56. The anvil 64 is preferably made of plastic or wood to eliminate any sparking which might be generated by contact with the striking bar.

Referring particularly to FIG. 2, the apparatus 14 includes an improved pressure fluid actuator generally designated by the numeral 68. The actuator 68 includes a cylindrical housing 70 having a bore 72 in which is disposed piston means including a plunger 74 connected to the piston rod 52. The plunger 74 is engaged with a resilient rolling diaphram 76 of a known type the perimeter of which is clamped between an end wall of the housing portion 70 and a transverse end wall of an intermediate housing member 78 thereby forming an expansible chamber 80. A conical coil spring 82 is disposed within the housing portion 70 and is interposed between the plunger 74 and an end wall 71. The spring 82 biases the plunger 74 and the striking bars 36 and 56 into the retracted position shown in FIG. 1.

The piston rod 52 projects through an enlarged opening 86 in the end wall 71 and a corresponding opening in the bulkhead 30 to permit lateral excursion of the rod as the striking bar 36 is rotated about the trunnions 44. The aforedescribed rolling diaphragm actuating mechanism advantageously provides a low friction actuator which accomodates the lateral excursion of the piston rod during movement thereof. Accordingly the actuator 68 is a superior, one-way, spring return type particularly suited for use with the exterminating apparatus 14.

The actuator 68 also advantageously includes a pressure fluid reservoir chamber 90 formed in part by the intermediate housing member 78 and a third housing portion 92 having an integral end wall forming a flange 94. The housing portions 70, 78 and 92 are suitably retained in fluid tight assembly by a plurality of elongated threaded fasteners 96, one shown in FIG. 2, which are respectively threadedly engaged with nuts 98 disposed in suitable recesses in the end wall 71 of the housing portion 70. As shown in FIGS. 1, 3 and 4 the actuator 68 is suitably secured to the bulkhead 30 by a plurality of threaded fasteners 100 threadedly engaged with the transverse end wall of the housing portion 70.

Referring again to FIG. 2, pressure fluid such as compressed air or an inert gas is admitted to the chamber 90 from a source, not shown, by way of a conduit 102 threadedly connected to the housing member 92. A filter element 104 is disposed in the chamber 90 to filter particulate matter out of the fluid flowing from the conduit 102 and through the chamber 90 to a passage 106 which leads to a control valve, generally designated by the numeral 108. The control valve 108 is suitably mounted on a manifold portion 110 of the intermediate housing portion 78 as shown in FIGS. 1 and 2. Pressure fluid is conducted from the control valve 108 to the chamber 80 by way of a passage 112 formed in the housing portion 78 including the manifold 110.

Figure 5:
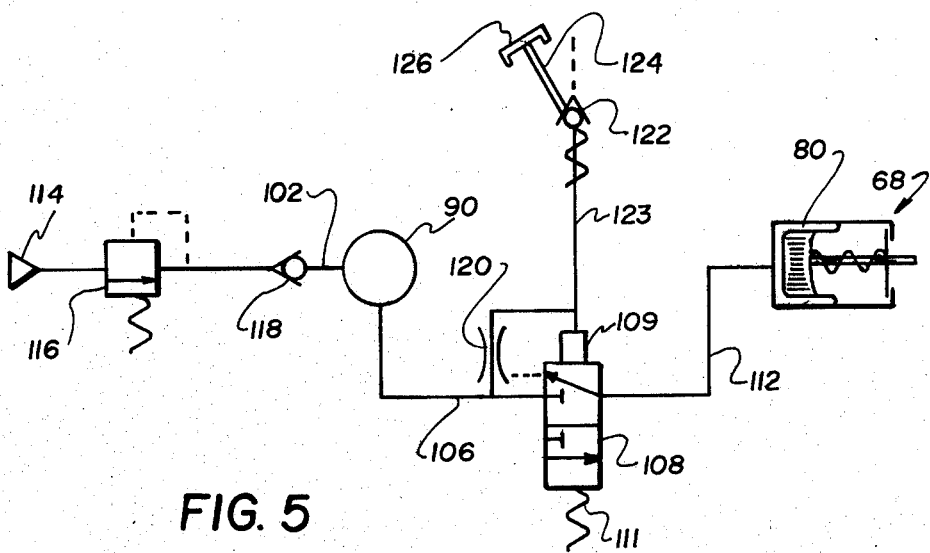
FIG. 5 is a schematic diagram of one embodiment of a control system in accordance with the present invention.

The control valve 108 is preferably a fast acting disk type valve which is shown schematically in FIG. 5 as a two position valve which is pressure fluid biased by a pilot actuator 109 into a position blocking the flow of fluid from the chamber 90 and exhausting fluid from the expansible chamber 80 of the actuator 68. On release of fluid pressure from the pilot actuator 109 the valve 108 is biased by an actuating spring 111 to a position to admit pressure fluid to the chamber 80 from the chamber 90. The valve 108 may be of the general type disclosed in U.S. Pat. No. 3,389,720.

Referring further to FIG. 5, one embodiment of a control circuit for use with the apparatus of the present invention includes a source of pressure fluid, designated by the numeral 114, which may be a large compressed air network, if available, or a portable pressure vessel. A suitable pressure regulator 116 is interposed in the supply conduit 102 to reduce the fluid pressure to the nominal operating pressure of approximately 620 Kpa. A check valve 118 is preferably interposed in the supply conduit 102 upstream of the chamber 90 particularly if the chamber 90 is to be charged for use of the apparatus without a larger source of pressure fluid as afore-mentioned.

The pilot actuator 109 of the valve 108 is supplied with pressure fluid by the way of a flow restriction which functions as a time delay device generally designated by the numeral 120 in FIG. 5. The time delay device 120 is of an improved type which will be described in further detail herein.

Pressure fluid is exhausted from the pilot actuator 109 by a normally closed check valve 122 having a mechanical actuator or trigger 124 which, when moved, opens the valve 122 to release fluid pressure in the pilot actuator 109. A suitable type of valve 122 is a so called whisker valve made by Clippard Instrument Laboratories, Inc., Cincinnati, Ohio and designated as a model MWV-1. The aforementioned commercial valve 122 is modified for use with the present invention to replace the actuating trigger or "whisker" with the trigger 124 also shown in FIG. 2 which includes a bait cup 126 adapted to be filled with a suitable attractant or bait and which, upon relatively light activation or contact by a rodent or the like, will unseat the valve 122 causing the valve 108 to shift rapidly to admit pressure fluid to the chamber 80.

When pressure fluid is admitted to the chamber 80 the rolling diaphragm actuator is rapidly displaced to extend piston rod 52 and rotate the crank portions 46, 47 to pivot the striking bars 36 and 56 downward toward the anvil 64 to strike and deliver a fatal blow to a rodent or the like. When the rodent is struck the trigger 124 is normally released and the valve 122 is reseated to the closed position. Thanks to the time delay device 120 the valve 108 will however remain in the position admitting pressure fluid to the chamber 80 thereby holding the striking bars in forcible engagement with the rodent for a period of time, which is preferably approximately ten seconds, to assure that fatal injuries have been inflicted. When fluid pressure is allowed to increase to a value which will actuate the pilot actuator 109 to move the valve 108 to the position which will vent the chamber 80 the spring 82 will cause the piston 74 and piston rod 52 to retract and rotate the crank portions 46, 47 whereby the striking bars 36 and 56 are retracted preparatory to another operating cycle of the apparatus 14.

It has been determined that a rodent exterminating apparatus in accordance with the present invention having an effective actuator piston diameter of approximately 6.25 cm and operating with pressure air at a nominal operating pressure of 620 Kpa has a response time in operation of from six to ten milliseconds which is sufficient to prevent a rodent from withdrawing from the vicinity of the striking bar after it has activated the trigger 124.

As will be appreciated from the foregoing description the apparatus 14 is adapted to operate continuously to deliver fatal injuries to any number of rodents or the like which may activate the trigger 124. Although the apparatus 14 is illustrated in a substantially horizontal position in FIGS. 1, 3 and 4, in order to prevent clogging of the apparatus by expired rodents, a preferable mounting arrangement of the apparatus would be to have the frame disposed vertically so that the opening in the frame in the vicinity of the anvil and the striking bars would be oriented downwardly. Moreover the apparatus would be preferably mounted some distance above floor level against a wall or beam so that on release of the striking bar the expired rodent would fall to the floor below the apparatus.

Figure 7:
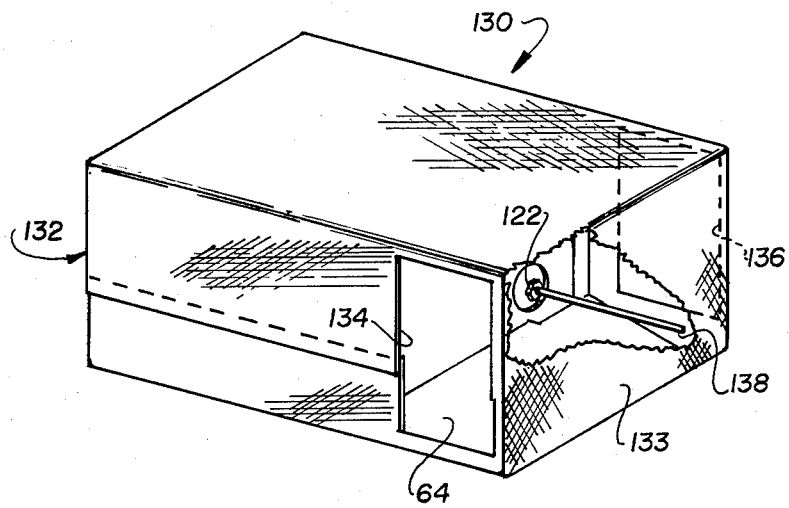
FIG. 7 is a perspective view of an alternate embodiment of the present invention.

An alternate embodiment of the apparatus of the present invention is illustrated in FIG. 7 of the drawings. Referring to FIG. 7 a rodent exterminating apparatus, generally designed by the numeral 130, is illustrated and which is provided with an enclosure 132 in place of the enclosure 15, 21 and having a transverse end wall 133 and openings 134 and 136 in the longitudinal side walls thereof. The openings 134 and 136 are adjacent respective opposite sides of the anvil 64. The apparatus 130 is otherwise identical to the apparatus 14 except for modification of the actuating trigger for the valve 122. The apparatus 130 is adapted to be interposed in a passageway leading to a room or the like which is otherwise closed to prevent ingress or egrees of rodents. Accordingly, a rodent would be forced to attempt to enter or exit the aforementioned enclosure through the openings 134 or 136 in the apparatus 130. In the embodiment illustrated in FIG. 7 the trigger mechanism for the valve 122 is characterized by an elongated thin rod or "whisker" 138 which extends into the pathway formed between the openings 134 and 136 in the enclosure 132. Accordingly if a rodent were to attempt to pass through the apparatus 130 it would unavoidably activate the trigger 138 thereby causing operation of the actuator 68 to deliver a fatal blow by the striking bars 36 and/or 56.

Figure 9:
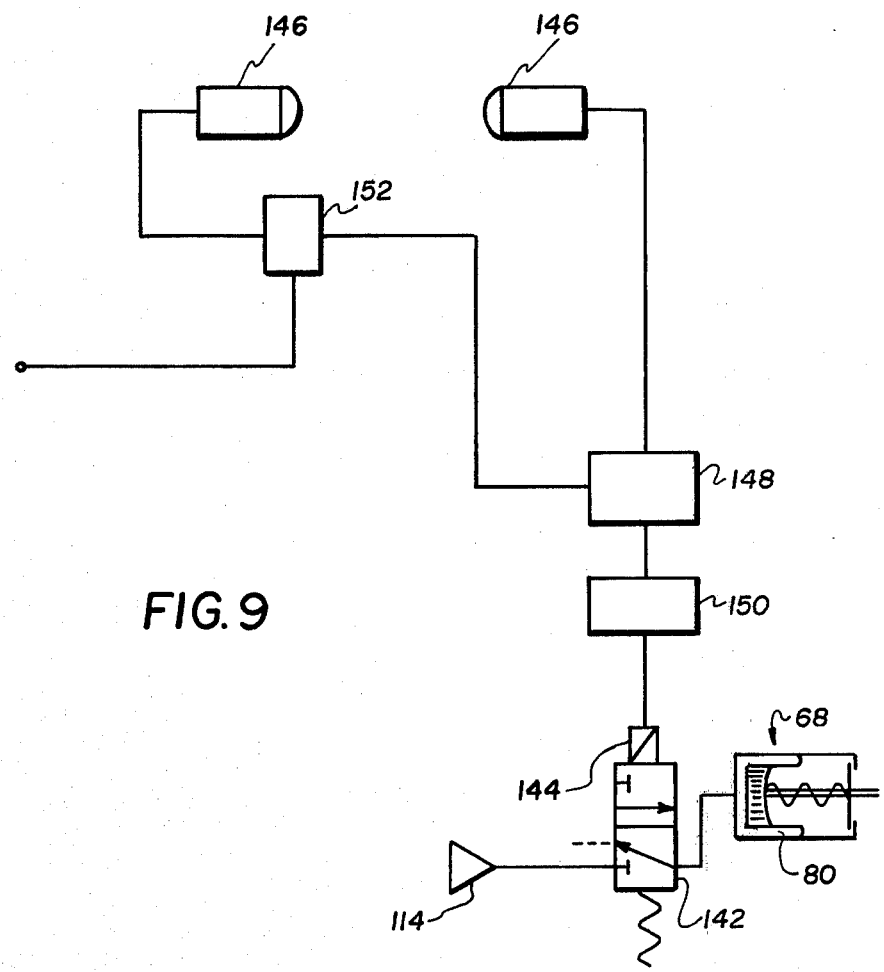
FIG. 9 is a schematic diagram of a second alternate embodiment of a control system for use with the embodiment of FIG. 7.

Referring to FIG. 9, an alternate embodiment of a control system for use with the apparatus of the present invention is illustrated in a schematic diagram. In the embodiment of the control system illustrated in FIG. 9 a control valve similar in some respects to the valve 108 is shown and generally designated by the numeral 142. The control valve 142 is energized by a solenoid actuator 144 and is interposed in the supply passage from the pressure fluid source 114 leading to the actuator 68. The control circuit illustrated in FIG. 9 includes proximity sensing means such as a sensor 146 responsive to interruption of an electromagnetic beam such a visible light beam generated by the sensor. Alternatively, the sensor 146 could be of a type which senses a change in magnetic flux density or high frequency acoustic vibrations. The sensor 146 could preferably be arranged in the pathway between the openings 134 and 136 of the enclosure 130 with reference to the embodiment of FIG.

7, for example, whereby upon sensing the presence of a rodent or the like a signal would be generated which would be transmitted to an amplifier 148. The signal generated in the amplifier 148 is delivered to a timing and logic circuit generally designated by the numeral 150 which would provide for energization of the solenoid actuator 144 thereby causing the valve 142 to shift to the position to permit pressure fluid to flow to the actuator 68. The control circuit 150 provides for a suitable time delay before de-energization of the solenoid 144 to permit the delivery of fatal injuries to the rodent before the striking bar is reset.

Figure 8:
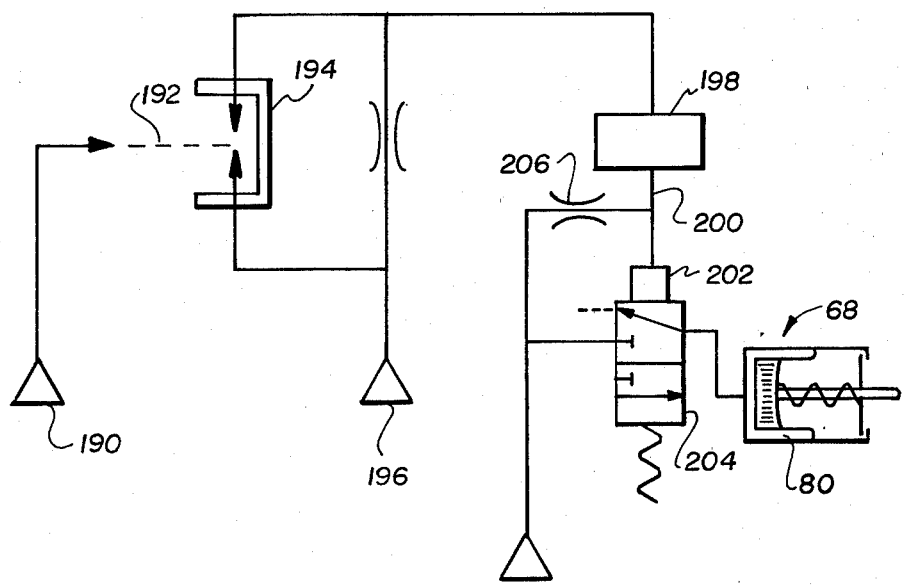
FIG. 8 is a schematic diagram of an alternate embodiment of a control system for use with the apparatus of FIG. 7.

In the use of the control circuit illustrated in FIG. 8 the exterminating apparatus is to be arranged such that the exterminated rodent upon release by the striking bar would be removed from the vicinity of the sensor 146 thereby permitting the circuit to be reset for another operating cycle. The control system illustrated in FIG. 9 is provided with electrical power from a suitable source and delivered to a power supply unit, generally designated by the numeral 152, to provide electrical power of suitable characteristics to the sensor 146 and the amplifier 148.

A second alternate embodiment of a control system in accordance with the present invention, using fluidic components, is illustrated in FIG. 8. In the control system of FIG. 8 a relatively low pressure source of pressure fluid such as compressed air, and designated by the numeral 190, is adapted to provide a jet flow stream, designated by the numeral 192, which is directed across an open space toward a device generally known as an interruptable jet sensor 194. The sensor 194 is suitably connected to a pressure fluid source 196 which is preferrably at a lower pressure than the source 190 and is in communication with a fluidic actuator 198. The actuator 198 is of a type which in response to the interruption of the jet flow stream 192 will receive a signal from the sensor 194 to vent a pilot actuator control line 200 connected to the pilot actuator 202 of a control valve 204 similar to the valve 108.

Accordingly, the control system illustrated in FIG. 8 may be adapted to be used with either embodiment of the rodent exterminating apparatus of the present invention by proper placement of the sensor 194 and the flow stream 192 so that an interruption of the flow stream 192 due to the presence of a rodent would cause the sensor 194 to provide a suitable signal to the actuator 198 resulting in shifting of the valve 204 to provide pressure fluid to the actuator 68. Upon striking and extermination of the rodent the flow stream 192 would resume and the sensor 194 would provide a signal to the fluidic actuator 198 causing the pilot actuator control line 200 to be closed after a suitable time delay provided by the time delay device 206. The pilot actuator 202 is pressurized sufficiently to cause the valve 204 to shift to vent pressure fluid from the actuator 68 thereby retracting the striking bar to the position shown in FIG. 1. The valve 204 and the time delay device 206 could be equivalent to the valve 108 and the time delay device 120, respectively.

The control system of the rodent exterminating apparatus of the present invention advantageously utilizes an improved pneumatic circuit element which may function, for example, as a time delay device and is basically a fluid flow restrictor.

Figure 6:
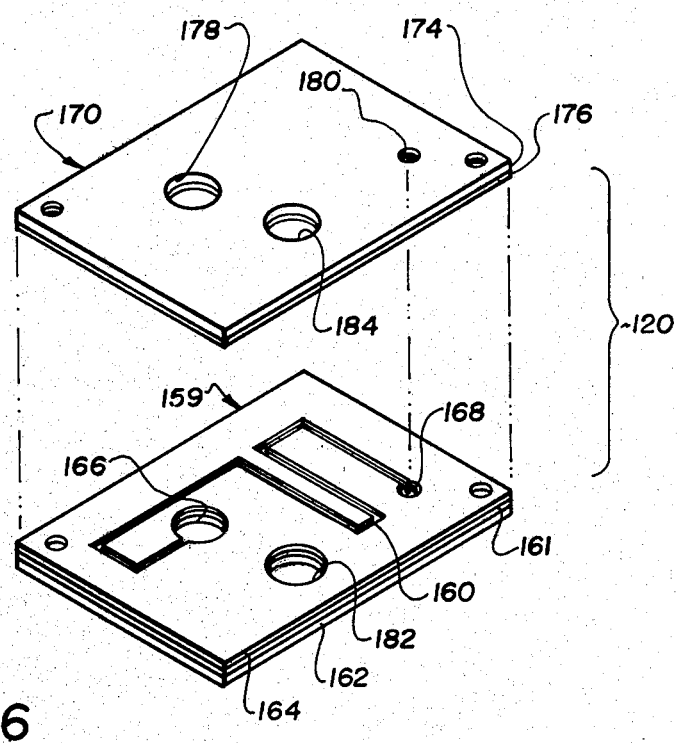
FIG. 6 is an exploded perspective view of an improved pneumatic timer for use in connection with the control system of the present invention.

Referring to FIG. 6 of the drawings, the time delay device 120, indicated schematically in FIG. 5, desirably takes the form of a flow restrictor comprising a tortuous flow path or passage means designated by the numeral 160. The passage means 160 is formed as a channel in a member 159 which is characterized by a relatively thin metallic sheet 161 bonded to a plastic or non-metallic backing 162 such as an epoxy laminate used as electrical printed circuit board backing. Accordingly the metallic sheet 161 may be a thin copper sheet clad with a layer of solder 164 or the like as used in printed circuit board manufacture.

The passage 160 terminates at one end in an opening 166 which is adapted to be in communication with passage 106 in the control system of FIG. 5. The opposite end of the passage 160 terminates in an enlarged recess 168 which is adapted to be in communication with the pilot actuator circuit 123 shown in FIG. 5. The passage 160 and the enlrged recess 168 may be formed using known printed circuit board manufacturing techniques such as photoetching for removing metal down to the surface of the epoxy backing 162 followed by application of the solder layer 164.

In the illustrated embodiment of the time delay device 120 there is provided a cover member 170 comprising a copper sheet 174 having a thin layer of solder or the like 176 thereon. Openings 178 and 180 are formed in the cover member 170 and are adapted to be aligned with the respective openings 166 and the recess 168 in the member 159. The members 159 and 170 are also provided with respective openings 182 and 184 which are aligned with each other when the members 159 and 170 are pressed together.

The members 159 and 170 are adapted to be pressed together and suitably heated to a temperature at which the thin layers of solder on each member will fuse together to form a fluid tight metallic bond between the members. The temperature to which the solder layers 164 and 176 are heated will result in a tight bond but said temperature is controlled to prevent the solder layers from flowing into the openings in the respective members or into the passage 160.

Accordingly a low cost reliable flow restrictor or time delay device is provided in accordance with the above described embodiment which may be sized to suit any pressure and time delay function desired by suitable design of the length, the shape and number of bends, and the cross sectional flow area of the passage 160. Moreover, the configuration of the members 159 and 170 may be designed to provide for mounting the device 120 as an integral part of various fluid control elements. For example, in a preferred embodiment of the timed delay device 120 it is configured to mount on the manifold 110 of the housing member 78 between the manifold and the body of the valve 108. Accordingly the openings 182 and 184, which are aligned with each other, provide a continuation of the passage 112 leading from the valve 108 to the expansible chamber 80. The openings 166 and 178 provide a continuation of the passage 106 for conducting pressure fluid to the valve 108. The opening 180 is adapted to be suitably aligned with the passage 123, shown schematically in FIG. 5, which is built into the body of the valve 108.

What I claim is:

1. A pressure fluid actuated apparatus for exterminating rodents and the like comprising:
    a frame;
    striking means movably mounted on said frame and operable to move from a retracted position to a position forcibly striking a rodent or the like and pinning said rodent between said striking means and an anvil means mounted on said frame;

a pressure fluid actuator operably connected to said striking means for moving said striking means between said retracted position and said striking position; and control means including means operable to sense the presence of a rodent in the vicinity of said striking means for causing said actuator to move said striking means from said retracted position to said striking position, and return to said retracted position.

2. The invention set forth in claim 1 wherein:
said striking means comprises a striking bar pivotally mounted on said frame.

3. The invention set forth in claim 2 wherein:
said frame includes spaced apart bearing means for pivotally supporting said striking bar, and said striking bar includes crank portions operably engaged with said actuator.

4. The invention set forth in claim 3 together with:
a second striking bar disposed on said apparatus and operable to be actuated by said actuator together with said first striking bar.

5. The invention set forth in claim 1 wherein:
said actuator includes housing means, piston means connected to a piston rod, means for biasing said piston means in a direction to move said striking means to the retracted position, said piston means being fluid actuated to move said striking means to the striking position.

6. A pressure fluid actuated apparatus for exterminating rodents and the like comprising:
a frame;
striking means movably mounted on said frame and operable to move from a retracted position to a position forcibly striking a rodent or the like and pinning said rodent between said striking means and an anvil means mounted on said frame;
a pressure fluid actuator operably connected to said striking means for moving said striking means between said retracted position and said striking position, said actuator including housing means including a bore, piston means including a rolling diaphragm disposed in said bore to define an expansible chamber and engaged with plunger means connected to a piston rod for moving said plunger means and said piston rod in response to pressure fluid being admitted to said bore to move said striking means to the striking position, and spring meand disposed in said bore and engageable with said plunger means for biasing said plunger means to move said striking means to said retracted position; and
control means including means operable to sense the presence of a rodent in the vicinity of said striking means for causing said actuator to move said striking means from said retracted position to said striking position, and return to said retracted position.

7. A pressure fluid actuated apparatus for exterminating rodents and the like comprising:
a frame;
striking means movably mounted on said frame and operable to move from a retracted position to a position forcibly striking a rodent or the like and pinning said rodent between said striking means and an anvil means mounted on said frame;
a pressure fluid actuator operably connected to said striking means for moving said striking means between said retracted position and said striking position, said actuator including a housing, piston means disposed in an expansible chamber formed in said housing and connected to a piston rod connected to said striking means, means for biasing said piston means in a direction to move said striking means to the retracted position, said piston means being fluid actuated to move said striking means to the striking position, said actuator including a reservoir chamber formed in said housing for storing a charge of pressure fluid in flow proximity to said expansible chamber; and control means including means operable to sense the presence of a rodent in the vicinity of said striking means for causing said actuator to move said striking means from said retracted position to said striking position, and return to said retracted position.

8. The invention set forth in claim 7 wherein:
said control means includes a valve interposed between said reservoir chamber and said expansible chamber, and said sensing means is operable in response to the presence of a rodent in the vicinity of said striking means for actuating said valve to deliver a quantity of pressure fluid to said expansible chamber from said reservoir chamber.

9. A pressure fluid actuated apparatus for exterminating rodents and the like comprising:
a frame;
striking means movably mounted on said frame and operable to move from a retracted position to a position forcibly striking a rodent or the like and pinning said rodent between said striking means and an anvil means mounted on said frame;
a pressure fluid actuator operably connected to said striking means for moving said striking means between said retracted position and said striking position, said actuator including an expansible chamber including piston means responsive to the delivery of pressure fluid to said expansible chamber to move said striking means toward said anvil means, and means for retracting said striking means in response to the venting of pressure fluid from said expansible chamber; and
control means including means operable to sense the presence of a rodent in the vicinity of said striking means for causing said actuator to move said striking means from said retracted position to said striking position, and return to said retracted position.

10. The invention set forth in claim 9 wherein:
said control means includes time delay means operable to delay the return of said striking means from the striking position to the retracted position.

11. The invention set forth in claim 10 wherein:
said control means includes conduit means for delivering pressure fluid from a source to said expansible chamber;
a control valve interposed in said conduit means between said source and said expansible chamber, said control valve being operable in a first position to vent said expansible chamber and block the flow of pressure fluid to said expansible chamber, said control valve being operable in a second position to admit pressure fluid to said expansible chamber; and
said control means includes pilot actuator means operable when energized to move said control valve to said first position, and means for de-energizing said pilot actuator in response to actuation of said sensing means to cause said control valve to move to deliver pressure fluid to said expansible chamber.

12. The invention set forth in claim 11 wherein:
said pilot actuator is pressure fluid operated, said sensing means includes valve means operable to be opened to vent pressure fluid from said pilot actuator when said sensing means is activated by a rodent or the like, said valve means being operable to close in response to de-activation of said sensing means upon extermination of said rodent to provide for pressurization of said pilot actuator.

13. The invention set forth in claim 12 wherein:
said time delay means includes means forming a restricted flow path for pressure fluid from said source to said pilot actuator to delay the energization of said pilot actuator to move said control valve to vent said expansible chamber.

14. The invention set forth in claim 12 wherein:
said sensing means includes trigger means including an attractant disposed in proximity to said striking means and operable to open said valve means in response to contact by a rodent or the like.

15. An improved apparatus for exterminating rodents and the like and characterized by:
a frame including spaced apart interconnected perimeter members and a transverse member mounted between said perimeter members;
striking means including a striking bar pivotally mounted on said frame for movement from a retracted position to a striking position;
a power actuator supported on said transverse member for driving said striking means between said positions;
an enclosure disposed around said frame and substantially enclosing said apparatus;
an opening in said enclosure in proximity to said striking means;
sensing means disposed within said enclosure for sensing the presence of a rodent or the like in proximity to said striking means; and
control means responsive to the sensing of the presence of a rodent by said sensing means for causing said power actuator to move said striking means from said retracted position to said striking position and return to said retracted position.

16. The invention set forth in claim 15 wherein:
said opening is provided in one end of said frame, and said sensing means includes means having a rodent attractant disposed thereon and within said enclosure in proximity to said striking means.

17. The invention set forth in claim 15 wherein:
said opening includes opposed openings in opposite side walls of said enclosure and forming a pathway through said apparatus in proximity to said striking means, and said sensing means includes trigger means interposed in said pathway and operable to be activated by a rodent or the like for causing said actuator to move said striking means to the striking position.

18. The invention set forth in claim 15 wherein:
said actuator includes piston means, a piston rod connected to said piston means, a cross bar member mounted on the distal end of said piston rod, and said striking bar includes crank portions operably connected to said cross bar member and responsive to the movement of said piston rod to move between said retracted position and said striking position.

19. The invention set forth in claim 12 wherein:
said sensing means includes a fluid jet sensor responsive to the interruption of a fluid jet flow stream by the presence of a rodent or the like to cause said valve means to vent pressure fluid from said pilot actuator.

20. The invention set forth in claim 10 wherein:
said control means includes a power operated valve responsive to receiving a signal for operating to provide pressure fluid to said expansible chamber, and said control means includes a sensor operable to sense the interruption of an electromagnetic beam for producing a signal operable to cause said valve to be operated to provide pressure fluid to said expansible chamber, and said time delay means is operable to cause said valve to vent pressure fluid from said expansible chamber after a predetermined period of time commencing with a change in said signal from said sensor.

21. The invention set forth in claim 8 wherein:
said housing means includes a manifold portion including first passage means therein in communication with said reservoir chamber and second passage means in said manifold in communication with said expansible chamber, said control valve being disposed on said manifold and in communication with said first and second passage means.

22. The invention set forth in claim 21 together with:
pressure fluid time delay means disposed on said housing means between said manifold and said control valve.

* * * * *